US007904760B2

(12) United States Patent
Shaffer et al.

(10) Patent No.: US 7,904,760 B2
(45) Date of Patent: Mar. 8, 2011

(54) METHOD AND SYSTEM FOR USING PRESENCE INFORMATION IN ERROR NOTIFICATION

(75) Inventors: Shmuel Shaffer, Palo Alto, CA (US); Joseph F. Khouri, San Jose, CA (US); Gebran G. Chahrouri, Menlo Park, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 585 days.

(21) Appl. No.: 11/176,836

(22) Filed: Jul. 6, 2005

(65) Prior Publication Data

US 2007/0011498 A1      Jan. 11, 2007

(51) Int. Cl.
*G06F 11/00* (2006.01)
(52) U.S. Cl. ............................................. 714/57; 714/46
(58) Field of Classification Search .................... 714/46, 714/57
See application file for complete search history.

(56) References Cited

U.S. PATENT DOCUMENTS

| | | | | |
|---|---|---|---|---|
| 5,402,429 A | 3/1995 | Stessens | ....................... | 371/37.1 |
| 5,590,329 A | 12/1996 | Goodnow, II et al. | ........ | 395/708 |
| 5,696,486 A * | 12/1997 | Poliquin et al. | ............... | 340/506 |
| 5,708,774 A | 1/1998 | Boden | ..................... | 395/183.14 |
| 5,862,316 A | 1/1999 | Hagersten et al. | ....... | 395/182.13 |
| 5,974,576 A | 10/1999 | Zhu | ............................... | 714/704 |
| 6,064,304 A * | 5/2000 | Arrowsmith et al. | ......... | 340/506 |
| 6,397,355 B1 | 5/2002 | Curtis et al. | .................... | 714/38 |
| 6,567,937 B1 * | 5/2003 | Flores et al. | .................... | 714/46 |
| 6,701,481 B2 | 3/2004 | Kaneda | ......................... | 714/765 |
| 6,772,376 B1 * | 8/2004 | Merkin et al. | .................. | 714/48 |
| 7,036,049 B2 * | 4/2006 | Ali et al. | ......................... | 714/47 |
| 7,200,779 B1 * | 4/2007 | Coss et al. | ..................... | 714/48 |
| 7,260,632 B2 * | 8/2007 | Shaffer et al. | ................. | 709/224 |
| 2001/0013109 A1 * | 8/2001 | Daimon et al. | ................. | 714/57 |
| 2003/0093710 A1 * | 5/2003 | Hashimoto et al. | .............. | 714/4 |
| 2004/0189460 A1 * | 9/2004 | Heaton et al. | ................. | 340/500 |

OTHER PUBLICATIONS

Microsoft Computer Dictionary, Fifth Edition, 2002, Microsoft Press, p. 97.*

* cited by examiner

*Primary Examiner* — Joshua A Lohn
(74) *Attorney, Agent, or Firm* — Baker Botts L.L.P.

(57) ABSTRACT

A method for using presence information in error notification includes detecting an error associated with operation of a software system and executing a workflow in response to detecting the error to determine error transmission information instructions. The method includes using presence information to identify one or more targets for receipt of error information based on the execution of the workflow and transmitting error information to the one or more identified targets.

24 Claims, 2 Drawing Sheets

METHOD AND SYSTEM FOR USING PRESENCE INFORMATION IN ERROR NOTIFICATION

TECHNICAL FIELD OF THE INVENTION

This invention relates in general to communication systems and, more particularly, to a method and system for using presence information in error notification.

BACKGROUND OF THE INVENTION

Software systems are extremely important in today's society. Errors that occur in operation of such software systems need to be quickly corrected to minimize the impact of the errors. As a result, error notification is an important aspect of the operation of any software system, including call center and IP telephony systems. When a software system encounters an error, it needs to log error messages and, depending on the severity of the error, sends notification(s) to a predefined list of people (e.g., system administrators) often with a static contact information to alert them of the failure.

SUMMARY OF THE INVENTION

The present invention provides a method and system for using presence information in error notification that substantially eliminates or reduces at least some of the disadvantages and problems associated with previous methods and systems.

In accordance with a particular embodiment, a method for using presence information in error notification includes detecting an error associated with operation of a software system and executing a workflow in response to detecting the error to determine error transmission information instructions. The method includes using presence information to identify one or more targets for receipt of error information based on the execution of the workflow and transmitting error information to the one or more identified targets.

The error information may comprise a notification of the error. Using presence information to identify one or more targets may comprise using presence information to identify a first target using instant messaging, a phone or chat communications. Transmitting error information to the one or more identified targets may comprise transmitting an instant message or chat message including the error information to the first target or calling the first target on the phone. The method may further comprise logging both the transmission of error information to the one or more identified targets and the respective communication method through which the error information was transmitted to each of the one or more identified targets.

In accordance with another embodiment, a system for using presence information in error notification includes a presence server operable to store presence information for a plurality of targets. The system includes an error detector coupled to the presence server and operable to detect an error associated with operation of a software system. The system includes a processor coupled to the error detector and operable to execute a workflow in response to detecting the error to determine error transmission information instructions, use the presence information to identify one or more targets for receipt of error information based on the execution of the workflow and transmit error information to the one or more identified targets.

In accordance with another embodiment, a method for using presence information in error notification includes detecting an error associated with operation of a software system and executing a workflow in response to detecting the error to determine error transmission information instructions. The method includes identifying a first target for receipt of error information based on the execution of the workflow and transmitting error information to the first target. The method also includes using presence information to determine whether the first target received the error information by the first target.

Technical advantages of particular embodiments include the use of presence information and workflow programming to perform intelligent and effective notification of errors in software systems. Workflows and presence information are used to optimize the selection of notification targets (e.g., system administrators) upon encountering an error. Notification mechanisms may use presence information of potential targets to determine to whom and in what manner error information should be transmitted in the event of a software system error. Accordingly, efficiency in error detection and notification systems is increased since appropriate and available targets may be identified based on their current availability. In addition, there is a decreased chance that resources will be wasted from attempting to notify targets who are not currently available.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
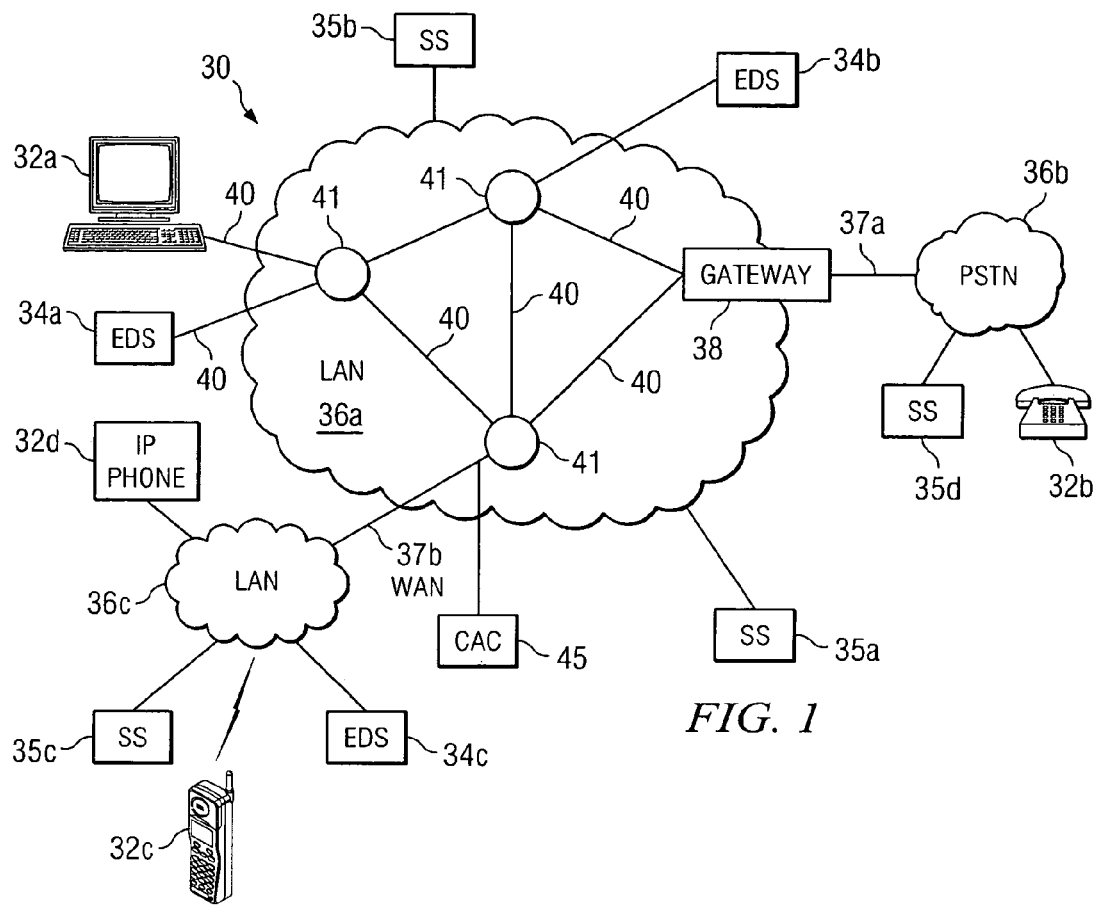
FIG. 1 illustrates a communication system including a plurality of endpoints operable to communicate among each other, a plurality of software systems and a plurality of error detection systems, in accordance with a particular embodiment.

FIG. 1 illustrates a communication system 30 including a plurality of endpoints 32a-32d having the ability to establish communication sessions between each other, error detection systems (EDSs) 34a-34c and software systems (SSs) 35a-35d, using one or more of communication networks 36a-36c. Software systems 35a-35d are systems that run software or encoded logic to provide functionality for one or more persons or enterprises. Software systems 35a-35d may include, for example, call centers, IP telephony systems, document management systems are any other type of system using software to provide functionality. EDSs 34a-34c detect errors in the operation of SSs 35a-35d and transmit information relating to errors detected to various users, such as users of endpoints 32a-32. It should be understood that embodiments discussed herein are applicable to hardware as well as software systems. Thus, any reference herein to a "software system" shall include both software and hardware systems.

In particular embodiments, EDSs 34a-34c monitor SSs 35a-35d and detect errors in the operation of such software and hardware systems. EDSs 34a-35c execute workflows containing instructions for transmitting error information, such as notifications of detected errors, to potential targets based on the availability of such potential targets. The potential targets may include system administrators or other personnel who may be notified about detected errors so that appropriate measures may be undertaken to minimize or alleviate the issues that invoke the errors. Potential targets may be identified using presence information determined by EDSs 34a-35c. Thus, particular embodiments use presence information and workflow programming to perform intelligent and effective notification of errors in software systems. For example, a workflow may identify a potential target to be notified about a particular error, and an EDS may notify the target of the error through a communication method identified as currently being used by the target. If a top priority target is currently unavailable (as determined by the presence information), the workflow may direct the EDS to use presence information to check the availability of another target to be notified. Various additional embodiments are further described below. For example, in some embodiments the workflow may determine that multiple resources are required to resolve the problem. As a result, the system may invoke a chat and invite all of the required participants and/or may automatically create a conference bridge and conference in all of the required participants based on their availability.

In the illustrated embodiment, communication network 36a is a local area network (LAN) that enables communication between a plurality of endpoints 32a-32d, EDSs 34a-34c and SSs 35a-35d distributed across multiple cities and geographic regions. In another embodiment, a single, central EDS may be used, which detects errors in SSs 35a-35d distributed across multiple cities and geographic regions. Communication network 36b is a public switched telephone network (PSTN) and couples endpoint 32b and SS 35d with communication network 36a through gateway 38. Communication network 36c is another LAN, which couples endpoints 32c and 32d, EDS 34c and SS 35c with communication network 36a. Accordingly, users of endpoints 32a-32d, EDSs 34a-34c and SSs 35a-35d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with EDSs 34a-34b, SSs 35a-35b, gateway 38 and communication networks 36b-36c. Therefore, a user of endpoint 32a is provided with access to endpoints 32b-32d, EDSs 34a-34c and SSs 35a-35d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, EDSs 34a-34c and/or SSs 35a-35d.

In a particular embodiment, communication network 36a employs voice communication protocols that allow for the addressing or identification of endpoints, nodes, EDSs and/or SSs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data, including presence information, instant messages and SMS messages, using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call, IM session, SMS session or fax transmission over IP networks.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, EDSs 34a-34c, SSs 35a-35d and/or gateway 38 may be any combination of hardware, software and/or encoded logic that provides communication services to a user and performs the functionality described herein. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, EDSs, SSs, segments, nodes, and gateways, communication system 30 contemplates any number or arrangement of such components for communicating media.

Figure 2:
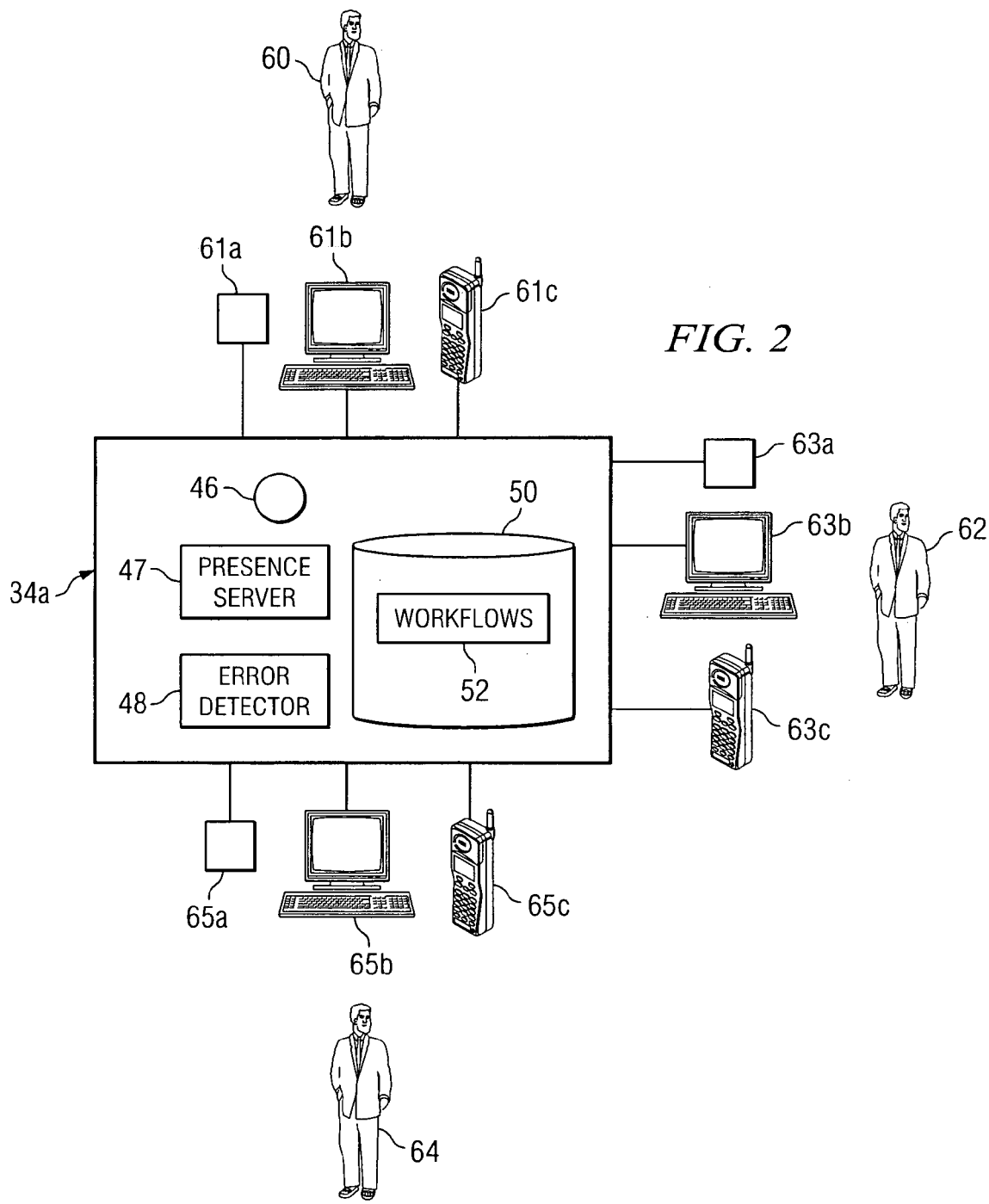
FIG. 2 illustrates an error detection and notification system of FIG. 1 in more detail, illustrating aspects of the present invention.

FIG. 2 illustrates EDS 34a in more detail, in accordance with a particular embodiment of the present invention. EDS 34a includes a processor 46, a presence server 47, an error detector 48 and a memory module 50. Also illustrated are a plurality of user targets 60, 62 and 64 who are each associated with respective endpoints 61, 63 and 65, respectively. User targets 60, 62 and 64 may include system administrators or other personnel who may be notified about detected errors so that appropriate measures may be undertaken to minimize or alleviate the issues that invoke the errors. It should be understood that endpoints 61, 63 and 65 may be coupled to EDS 34a through one or more communication networks, such as those discussed above with respect to communication system 30.

Processor 46 may be a microprocessor, controller, or any other suitable computing device, resource, or combination of hardware, software, and/or encoded logic that allows processor 46 to perform, either alone or in conjunction with other components such as components of EDS 34a, the functionality of EDS 34a.

Memory module 50 may be any form of volatile or non-volatile memory including, without limitation, magnetic media, optical media, random access memory (RAM), read-only memory (ROM), removable media, or any other suitable local or remote memory component. Memory module 50 includes workflows 52 which may be executed upon detection of an error in a software system, as further discussed below.

Presence server 47 may be any combination of hardware, software, and/or encoded logic, and is used to detect and monitor the presence of user targets at their endpoints. Presence server 47 may include a single computer or a group of computers that are capable of detecting the presence of user targets at an endpoint. In some cases, a target's endpoints may include presence client applications running on the endpoints. Examples of presence servers include presence servers as defined by IETF specifications. Presence server 47 may detect that user targets are communicating on particular endpoints using a variety of communication methods. For example, presence server 47 may detect that a user target is currently communicating on his cell phone, IP phone, work phone, home phone, pager, PDA, PC or any other communication device. In addition, presence server 47 may detect that a user target is currently communicating using a particular communication method, such as e-mail, instant messaging or SMS.

Error detector 48 may be any combination of hardware, software and/or encoded logic that detects error in a software system, such as software systems 35a-35d of FIG. 1 discussed above. Error detector 48 may monitor software systems in communication system 30 and may use any suitable methods to detect errors in the software systems.

In the illustrated embodiment, user target 60 is associated with endpoints 61a-61c, which may comprise, for example, an IP phone, a personal computer (PC) and a cell phone. User target 62 is associated with endpoints 63a-63c, and user target 64 is associated with endpoints 65a-65c. User targets may be associated with any number or type of endpoints, such as those referenced above with respect to FIG. 1. In some cases, user targets may not be statically associated with certain endpoints; rather, user targets may logon and/or may otherwise use any particular endpoint (e.g., after authentication). At this point the user targets may become associated with the endpoint.

As indicated above, particular embodiments provide the ability to use presence information in notifying targets of errors in software systems. When an error in a software system is detected, for example by error detector 48, processor 46 selects a particular workflow 52 to execute based on the type of error and the software system with which the error is associated. Workflows 52 include instructions regarding who should be notified about the error and the error information that should be transmitted to those notified. The instructions regarding notification and error information transmission may be based on who is currently logged into a system or otherwise communicating on an endpoint at the present time. Workflows may be programmed or otherwise stored by a software system administrator or other personnel based on any suitable operational desires with respect to error notification and information transmission.

As an example, upon detection of an error processor 46 may execute a workflow 52 that instructs the processor to notify user target 60 if user target 60 is available on one of endpoints 61. Processor 46 uses presence information stored in presence server 47 to determine whether user target 60 is available on an endpoint 61. As an example, if user target 60 is currently using instant messaging on PC endpoint 61b, then processor 46 may transmit error information through an instant message communication to PC endpoint 61b of user target 60. The error information may include any suitable information associated with the detected error, such as error type, time of detection, error location, suggested remedies and potential impact of the error. Other information may be transmitted, such as an identification of others contacted or whose contact has been attempted in connection with the detected error.

Continuing the above example, if user target 60 is not available at endpoints 61, then execution of workflow 52 may direct processor 46 to determine, based on presence information, whether user target 62 is available at any of associated endpoints 63. If so, processor 46 may transmit error information to user target 62 at a suitable endpoint 63.

Thus, particular embodiments utilize workflow programming along with the presence information of notification targets (e.g., system administrators) to perform intelligent and effective error notification. As an example, a system administrator can program the notification logic through workflow 52 that first attempts to contact those whose presence indicates that they are currently online and verify that they have been reached properly. In this manner, EDS 34a can better ensure that someone actually received the notification and thus can better act upon it. In addition, unnecessary notifications are avoided, such as waking people in the middle of the night while others already at work could have been notified instead.

In some embodiments, a workflow 52 may be configured with a prioritized list of notification targets for a given type of errors (e.g. for voice quality errors contact user target 60 and then user target 62, for call completion errors contact user targets 62 and then user target 60). In some embodiments, EDS 34a may work through a personal assistant or contact manager system for a given notification target.

As an additional example of notifying user targets based on communication availability, EDS 34a may bring up a chat session with all (or a subset) of the targets who are identified by the presence functionality. Similarly, EDS 34a may bring up a conference bridge and conference in all participants identified based on a workflow and their presence information. For example, processor 46 of EDS 34a may, either alone or in conjunction with a multipoint conference system operable to establish conference calls with endpoints, connect identified targets in a conference call session for transmitting error information and working out issues with the error. This will enable the participants to agree between themselves who should take ownership of the particular error issue.

In particular embodiments, if a particular notification target (e.g., a particular system administrator) is not reachable then EDS 34a can search in the local directory access protocol (LDAP) directory (e.g., organizational tree) for the escalation (or management reporting) chain within the organization of the person to determine the next potential target for receipt of the error information.

In particular embodiments, processor 46 may log information concerning who was contacted by the EDS and through what manner, (e.g., user 64 was contacted via instant message at X time). Any suitable type of information associated with the error notification and transmission may be logged. In addition, EDS 34a may provide real-time and historical reports on these notifications that are useful workforce planning.

It will be recognized by those of ordinary skill in the art that EDS 34a is merely one example configuration of an EDS for using presence detection in error notification. EDS 34a may include any number of call managers, processors, memory modules, presence servers and error detectors to accomplish the functionality and features described herein. For example, although EDS 34a is illustrated and described as including a processor 46, a presence server 47, an error detector 48 and a memory module 50 these components and other desired components for performing the above described functionality may be centrally located (local) with respect to one another, or distributed throughout communication system 30.

Additionally, it will be recognized that the configuration of endpoints 61, 63 and 65 illustrated in FIG. 2 is for example purposes only. Accordingly, it is recognized that any type or number of endpoints may be associated with any number of user targets according to particular system configurations or needs. In addition, as discussed above, users may be dynamically associated with any endpoint upon, for example, logging in and authentication with that specific endpoint.

Figure 3:
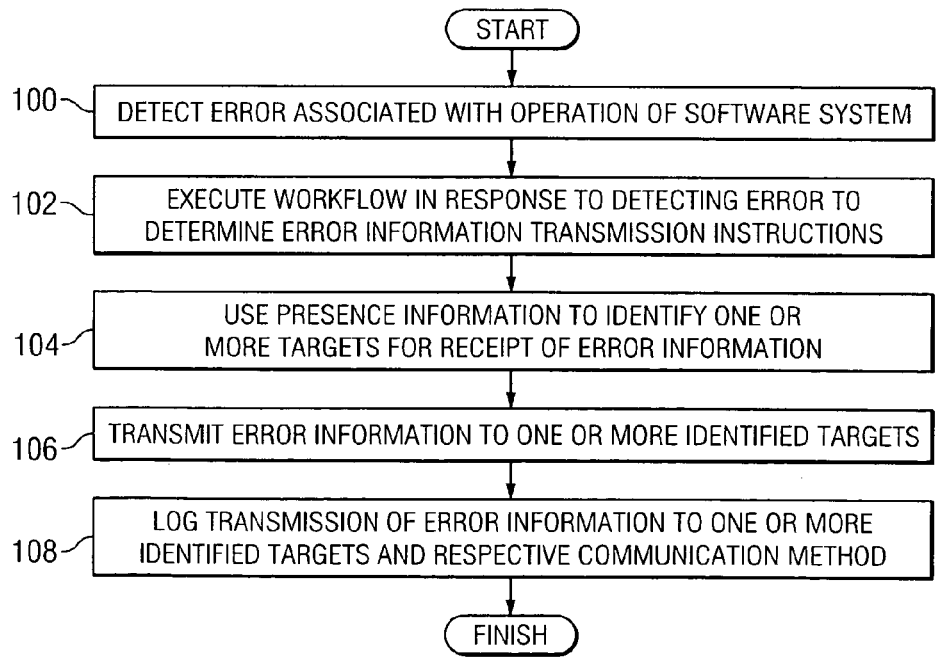
FIG. 3 illustrates a method for using presence information in error notification, in accordance with an embodiment of the present invention.

FIG. 3 is a flowchart illustrating a method for using presence information in error notification, in accordance with an embodiment of the present invention. The method begins at step 100 where an error associated with operation of a software system is detected. As indicated above, this step may also apply to detecting an error associated with operation of a hardware system. The error may be detected by an error detector coupled to the software system through one or more communication networks. At step 102, a workflow is executed in response to detecting the error to determine error information transmission instructions. For example, the workflow may indicate to whom error information, such as a notification of the error, should be transmitted. The workflow may indicate that transmittal of error information may depend upon the availability of one or more targets. In addition, the workflow may indicate that the manner of communication of the error information may depend on communication methods currently being used by potential targets. Potential targets may include system administrators and other personnel who may be able to take action to minimize impact of the error on the software system.

At step 104, presence information is used to identify one or more targets for receipt of error information based on the execution of the workflow. For example, a first target may be identified based on the workflow because he is currently using instant messaging, a particular phone, chat or other communication method. At step 106, error information is transmitted to the one or more identified targets. In some cases, the error information may include notification of the error or error type, time of detection, error location, suggested remedies and potential impact of the error. In some cases, the workflow may indicate that a first target should receive the error information. However, at step 104 the presence information may indicate that the first target is not currently available on any suitable communication method. Thus, in response to determining that the first target is not available, a second target may be identified based on the workflow. Presence information may be used to determine that the second target is available and that the second target is using a particular communication method, and the error information may be transmitted to the second target through the communication method being used by the second target.

At step 108, transmission of error information to the one or more identified targets is logged. In addition, the respective method of communication for the transmission of the error information is logged. This logged information may be used to provide real-time and historical reports.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the use of presence information and workflow programming to perform intelligent and effective notification of errors in software systems. Workflows and presence information are used to optimize the selection of notification targets (e.g., system administrators) upon encountering an error. Notification mechanisms may use presence information of potential targets to determine to whom and in what manner error information should be transmitted in the event of a software system error. For example, if a system administrator is logged in via chat then a chat message may be sent and a response be awaited and verified to confirm a successful notification. Targets are notified who are available via any communication method, such as IM, according to their presence information rather than just by using static, pre-configured identification information. The system may provide logs of the system error notifications. This can include who was contacted, the time he was contacted, the manner of contact (e.g., IM) and the status of contact (e.g., person acknowledged notification via IM). Accordingly, efficiency in error detection systems is increased since appropriate and available targets may be identified based on their current availability. In addition, there is a decreased chance that resources will be wasted from attempting to notify targets who are not currently available.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and error detection system 34a, these elements may be combined, rearranged or positioned in order to accommodate particular routing architectures or needs. In addition, any of these elements may be provided as separate external components to communication system 30, error detection system 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for using presence information in error notification, comprising:
   detecting an error associated with operation of a software system;
   executing a workflow in response to detecting the error to determine error transmission information instructions;
   identifying a first target for receipt of error information based on the execution of the workflow;
   transmitting error information to the first target;
   using presence information to determine whether the first target received the error information;
   determining using the presence information that the first target did not receive the error information;
   in response to determining that the first target did not receive the error information, identifying a second target for receipt of error information based on the execution of the workflow;
   transmitting error information to the second target; and
   using presence information to determine whether the second target received the error information.

2. The method of claim 1, wherein the error information comprises a notification of the error.

3. The method of claim 1, wherein:
   using presence information to determine whether the first target received the error information comprises using presence information to identify that the first target is using instant messaging to determine whether the first target received the error information.

4. The method of claim 1, wherein:
   using presence information to determine whether the first target received the error information comprises using presence information to identify that the first target is using a first phone to determine whether the first target received the error information.

5. The method of claim 1, wherein:
   using presence information to determine whether the first target received the error information comprises using presence information to identify that the first target is logged in using chat communications to determine whether the first target received the error information.

6. The method of claim 1, further comprising logging the transmission of error information to the second target and the respective communication method through which error information was transmitted to the second target.

7. The method of claim 1, further comprising using presence information to identify a type of communication in use by the second target for transmission of the error information to the second target.

8. The method of claim 7, wherein the type of communication in use by the second target is instant messaging.

9. The method of claim 7, wherein the type of communication in use by the second target is phone communication.

10. The method of claim 1, further comprising selecting the workflow for execution based on a type of the detected error.

11. A system for using presence information in error notification, comprising:
    a presence server operable to store presence information for a plurality of targets;
    an error detector coupled to the presence server and operable to detect an error associated with operation of a software system; and
    a processor coupled to the error detector and operable to:
       execute a workflow in response to detecting the error to determine error transmission information instructions;
       identify a first target for receipt of error information based on the execution of the workflow;
       transmit error information to the first target;
       use presence information to determine whether the first target received the error information;
       determine using the presence information that the first target did not receive the error information;
       in response to determining that the first target did not receive the error information, identify a second target for receipt of error information based on the execution of the workflow;
       transmit error information to the second target; and
       use presence information to determine whether the second target received the error information.

12. The system of claim 11, wherein the error information comprises a notification of the error.

13. The system of claim 11, wherein:
    a processor operable to use presence information to determine whether the first target received the error information comprises a processor operable to use the presence information to identify that the first target is using instant messaging to determine whether the first target received the error information.

14. The system of claim 11, wherein:
    a processor operable to use presence information to determine whether the first target received the error information comprises a processor operable to use the presence information to identify that the first target is using a first phone to determine whether the first target received the error information.

15. The system of claim 11, wherein:
    a processor operable to use presence information to determine whether the first target received the error information comprises a processor operable to use the presence information to identify that the first target is logged in using chat communications.

16. The system of claim 11, wherein the processor is further operable to log the transmission of error information to the second target and the respective communication method through which error information was transmitted to the second target.

17. The system of claim 11, wherein the processor is further operable to use presence information to identify a type of communication in use by the second target for transmission of the error information to the second target.

18. The system of claim 17, wherein the type of communication in use by the second target is instant messaging.

19. The system of claim 17, wherein the type of communication in use by the second target is phone communication.

20. The system of claim 11, wherein the processor is further operable to select the workflow for execution based on a type of the detected error.

21. A system for using presence information in error notification, comprising:
    means for detecting an error associated with operation of a software system;
    means for executing a workflow in response to detecting the error to determine error transmission information instructions;

means for identifying a first target for receipt of error information based on the execution of the workflow;
means for transmitting error information to the first target;
means for using presence information to determine whether the first target received the error information;
means for determining using the presence information that the first target did not receive the error information;
means for, in response to determining that the first target did not receive the error information, identifying a second target for receipt of error information based on the execution of the workflow;
means for transmitting error information to the second target; and
means for using presence information to determine whether the second target received the error information.

22. Logic embodied in a non-transitory computer readable medium, the computer readable medium comprising code operable to:
detect an error associated with operation of a software system;
execute a workflow in response to detecting the error to determine error transmission information instructions;
identify a first target for receipt of error information based on the execution of the workflow;
transmit error information to the first target;
use presence information to determine whether the first target received the error information;
determine using the presence information that the first target did not receive the error information;
in response to determining that the first target did not receive the error information, identify a second target for receipt of error information based on the execution of the workflow;
transmit error information to the second target; and
use presence information to determine whether the second target received the error information.

23. The medium of claim 22, wherein the code is further operable to use presence information to identify a type of communication in use by the second target for transmission of the error information to the second target.

24. The medium of claim 22, wherein the code is further operable to select the workflow for execution based on a type of the detected error.

* * * * *